United States Patent [19]
Gabrielli

[11] 4,180,541
[45] Dec. 25, 1979

[54] METHOD OF EXTRUDING EMPLOYING AN EXTRUSION DEVICE HAVING INTERMEDIATE EXTRUDER

[76] Inventor: Ernesto Gabrielli, P.za Giovanni XXIII, Montale (PT), Italy

[21] Appl. No.: 873,392

[22] Filed: Jan. 30, 1978

Related U.S. Application Data

[63] Continuation of Ser. No. 722,525, Sep. 13, 1976, abandoned.

[30] Foreign Application Priority Data

Sep. 17, 1975 [IT]  Italy ............................... 45513 A/75

[51] Int. Cl.² ............................................. B29D 7/14
[52] U.S. Cl. ................................... 264/171; 264/174; 264/176 C; 264/176 R; 264/216
[58] Field of Search ................... 264/171, 174, 176 R, 264/176 C, 216, 175, 212; 425/461, 466, 113, 374, 376 R, 376 A; 156/500, 244.18

[56]  References Cited

U.S. PATENT DOCUMENTS

| | | | |
|---|---|---|---|
| 2,624,914 | 1/1953 | Rhodes | 264/216 |
| 2,892,212 | 6/1959 | Rhodes | 425/374 |
| 3,122,789 | 3/1964 | Coffee | 425/466 |
| 3,142,091 | 7/1964 | Curtiss | 425/374 |
| 3,274,645 | 9/1966 | Chase | 425/376 R |
| 3,278,988 | 10/1966 | Hannis | 425/376 R |
| 3,705,778 | 12/1972 | Collin | 264/212 |
| 3,871,810 | 3/1975 | Geyer | 425/376 R |
| 3,880,564 | 4/1975 | Beck | 425/376 R |
| 3,956,056 | 5/1976 | Boguslawski et al. | 264/176 R |

*Primary Examiner*—Jeffery R. Thurlow
*Attorney, Agent, or Firm*—McGlew and Tuttle

[57]  ABSTRACT

An extrusion method is shown using an extrusion device, comprises an extruder housing, having a cylindrical interior wall and a cylindrical rotor rotatable in the wall at spaced relationship from the interior wall of the housing, so as to define an extrusion passage therebetween which connects at one end to an inlet, and at an opposite end to an outlet, which has an extrusion control device located to close a portion of the extrusion passage. The construction also includes at least one second extrusion control device located in the passage between the outlet and the inlet, which is regulated to close at least a portion of the extrusion passage before the extruded material moves through the outlet.

2 Claims, 3 Drawing Figures

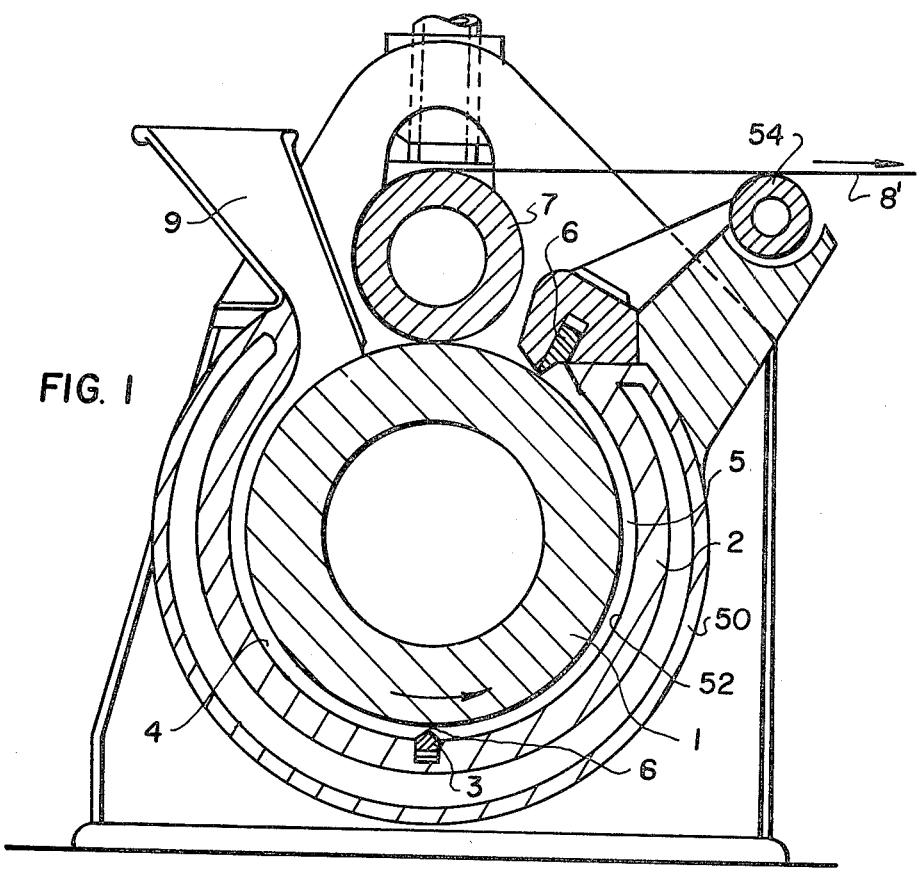
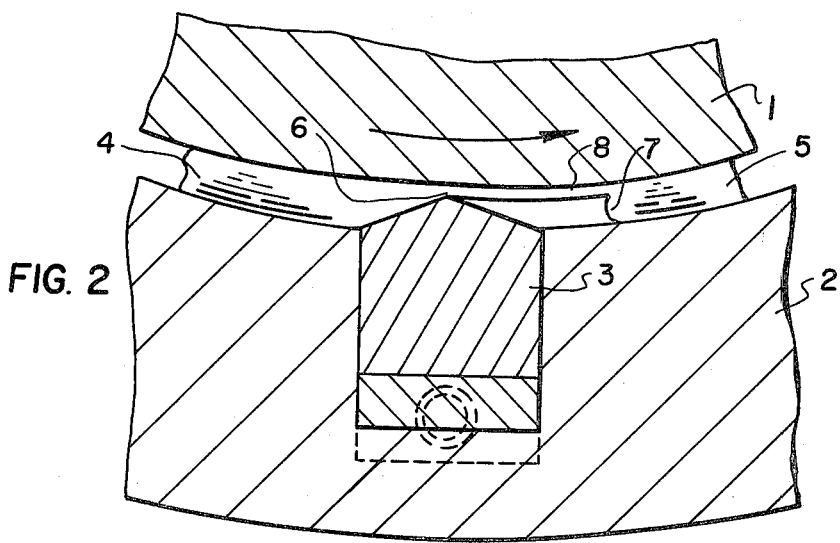

METHOD OF EXTRUDING EMPLOYING AN EXTRUSION DEVICE HAVING INTERMEDIATE EXTRUDER

This is a continuation of application Ser. No. 722,525 filed Sept. 13, 1976 now abandoned.

FIELD AND BACKGROUND OF THE INVENTION

This invention relates in general to the construction of extruders and, in particular, to a new and useful boundary layer extrusion press which includes an extrusion passage having the usual control device for closing off the passage at the extrusion discharge and an additional extruder within the passage for controlling the material flow ahead of the outlet control.

DESCRIPTION OF THE PRIOR ART

With the known boundary layer extrusion presses, its is difficult to obtain laminated products without limits in respect to width and thickness. The obtaining of an extruded laminate instead of a calendered laminate is very difficult to resolve and is impossible to effect beyond certain limits of width and thickness using the ordinary screw-type conveyor extrusion press.

SUMMARY OF THE INVENTION

In accordance with the present invention, there is provided an extrusion device which includes an extrusion passage which has a control device for regulating the extrusion discharge size and which further includes an additional control located within the feed passage for extruding the material before the final discharge. A boundary layer press constructed in accordance with the invention provides the possibility of feeding a transversal opening equal in width to the width of the press rotor with extrusion material which is maintained at a constant absolute pressure along the entire development of that width. For the feeding of an extrusion die of preponderantly transversal dimension, a first essential requirement is that the pressure be maintained uniformly at the entrance of the extrusion chamber. This primary consideration can be resolved by the use of dies of conventional design. With the invention, however, a first control device is located at the outlet of an extrusion passage around a rotatable rotor and, in addition to this extrusion control at the outlet, there is an intermediate control for regulating the extrusion flow within the extrusion passage.

In the preferred form of the invention, a cylindrical rotor is rotatable within an extruder housing having an interior cylindrical wall which is spaced from the periphery of the rotor and defines an extrusion passage therebetween. The material to be extruded is directed into one end of the annular passage during the rotation of the rotor and it is in effect partially extruded in its movement over to an outlet having an additional extrusion control through which the material is finally extruded. Advantageously, both controls are adjustable from the exterior of the machine in order to obtain a finished laminated product on the outside of the rotating cylindrical rotor.

Accordingly, it is an object of the invention to provide an extruder which includes a cylindrical housing having an interior cylindrical wall which is spaced radially outwardly from a wall of a cylindrical rotor and which defines a passage with the rotor which is connected at one end to a hopper for the inlet of the material to be extruded and which has an opposite outlet end having an adjustable device which closes at least a portion of the extrusion passage and which forms a laminate with a previously formed extrusion which is effected by a second extrusion device located in the extrusion passage before the final extrusion control.

A further object of the invention is to provide an extrusion device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

In the Drawings:

FIG. 1 is a transverse sectional view of part of an extruder constructed in accordance with the invention;

FIG. 2 is an enlarged partial view of the extruder shown in FIG. 1; and

DESCRIPTION OF THE PREFERRED EMBODIMENTS

Figure 3:
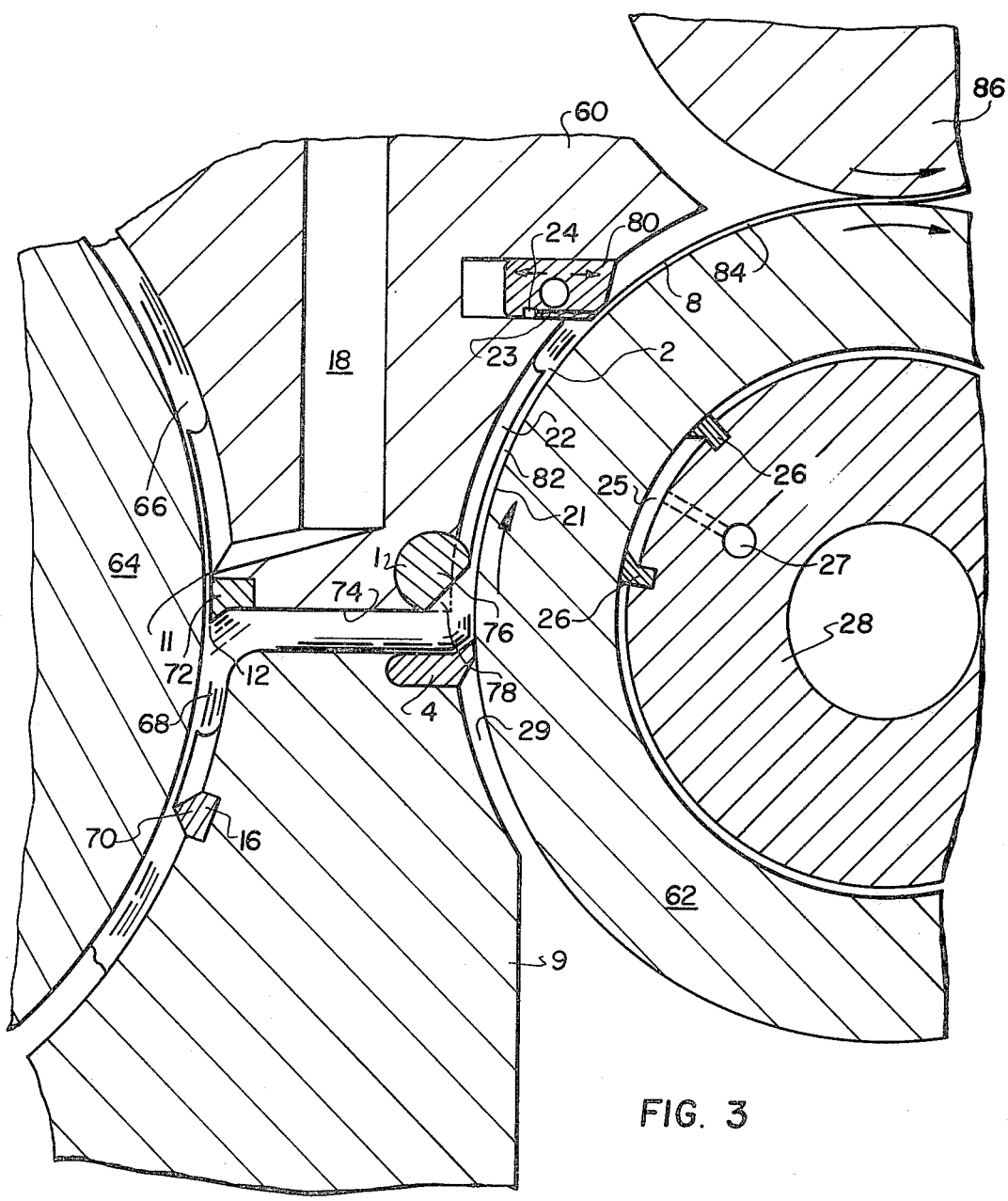
FIG. 3 is a view, similar to FIG. 1, of a complete embodiment of the invention.

Referring to the drawings in particular, the invention embodied therein in FIGS. 1 and 2, comprises an extruder which includes a housing 50 having an interior cylindrical wall 52 which is spaced radially outwardly from a cylindrical rotor 1 so as to define an extrusion passage 5 therebetween. The housing 50 also supports a rotatable pick-off roller 7 around which a finished laminated extrusion product is directed and passed over a delivery roller 54.

The material is supplied for plasticizing into a hopper 9 which feeds through an initial passage part 4 of an extrusion passage which includes the final passage part 5 and it passes beyond an extruder control valve 3 which regulates the width of an extuded laminate layer 8 from the plasticizing material 4. This first extruded laminate is fed through the terminal chamber 5 and the material then passes through an outlet having a second control 6 for regulating the thickness of a final laminate 8'.

Extrusion by means of conventional dies makes it possible to obtain the best qualities of films or sheets which are more than two millimeters thick. Very accurate tests and theoretical analyses, however, have demonstrated the great advantages and the variety of solutions which are obtainable with the method of extrusion by using the rotating cylinder independently of the boundary layer press by making use of the two separate extrusion controls of the invention.

In the complete embodiment of FIG. 3, an extrusion press includes a housing 60 which is spaced radially outwardly from the outer walls of a rotor 62 so as to define an extrusion passage 22 therebetween. In this embodiment, the housing 60 also cooperates with a second rotor 64 which defines a feed space 66 with the housing 60 for the infeed of material 68. The construction includes a shut-off or control device 70 arranged at one end of the passage 66, and an opposite control device 72 which may be closed to cause the material to flow in the direction through a first passage 74 into association with a closing device 4 which prevents any feed outwardly through the chamber 29. In this arrangement, the housing includes a first extrusion device 76 which is rotatably mounted in a cylindrical cavity 78 formed as an extension of the passage 22. The device 76 may be positioned as indicated in the drawings, to block off the further flow of the material from passage 74 into extrusion passage 22, and this may be rotated into a dotted line position in which the material may be permitted to flow completely through passage 22. Passage 22 is connected to an outlet having a control device 80 slidable into and out of the passage 22 which includes a transverse opening 24 which communicates with a groove 23 for the bypass of a portion of the extruded material. A first layer 82 of extruded material is formed downstream of the control device 76, and a second layer 84 is formed downstream of the control device 80 and the two laminated layers are moved under a drum 86. The control device 70 permits a flowing of a layer of material to effect a certain degree of stretching of the layer coming out of the extrusion orifice, and this orifice must have a thickness in excess of the thickness of the third layer 84.

The material coming from control device 70 would bear against the surface of the rotating cylinder 62 without any pressure in an absence of the device 76 for controlling the flow and, owing to the law of molecular adherence with the contact layer with the surface, which requires a pressure greater than zero, the material coming from the press with the set capacity would move to the end zone of the orifice or extrusion passage 22 in a disorderly and intermittent manner, instead of in a function of well defined and constant parameters. Otherwise, if the necessary total filling of passage 22 is effected to obtain the required molecular adherence between the material to be extruded in the wall of the cylinder, the pressure in the initial zone of the chamber or passage 22 would be greater than zero, and to this pressure, which moves unchanged into the section upstream of the extrusion device 80 would also be added to the non-negligible pressure resulting from the principle of breaking of the boundary layer operating in such conditions throughout the entire extent of the chamber 22. With the inventive arrangement, the internal extrusion device 1 is adjusted to establish in the zone downstream of the final discharge opening at the regulating device 80, a pressure value sufficient to determine the required adherence of the extruded material to the rotatable rotor 62. This effect of maintaining a cohered extruded layer will last until the filling section at the location 2 of the chamber 22. owing to the law of capacities, however, the thickness of the layer 21 inside the chamber 22 must be identical to the thickness of the finished layer 8 downstream of the external control device or orifice 80. The thickness of the extruded layer 8 is somewhat less than the thickness of the external extrusion orifice under the adjusting device 80, and, since the thickness 21 downstream of the adjusting device 76 cannot be different than the thickness 8 of the extruded layer passing through the control device 80, the material would come out of the extrusion orifice without touching the opening itself and this would therefore remain unused.

Since the internal extrusion is subjected to temperature differences of the stator walls 9 of the housing 60 along the passage 22 and further undergoes the effects of the state of the surface smoothness of the stator walls, the film collected directly from the extrusion device 76 would have a lesser degree of perfection than the film from the extruder 80.

The possible difference in temperature along the transversal development of the cylindrical surface of rotor 62 adjust themselves spontaneously by the effect of the law of variation of viscosity with the temperature. The colder areas increase the coefficient of viscosity of the material, whereby, the work of breaking the boundary layer in this zone increases positively by heating this area to a higher degree and, therefore, continually leveling the temperature along the entire width of the extrusion.

The scope of the invention includes not only the application of the device 76 in the chamber 22 on rotating cylinder 62, but also the devices designed to eliminate the disadvantage caused by the thickness of the layer 21 in chamber 22 equal to the thickness 8 of the film collected downstream of the external extrusion orifice, and therefore, less than said extrusion orifice. The first system to eliminate this disadvantage comprises making the internal extrusion orifice slightly and uniformly corrugated in the transversal direction. The amplitude of the change in the depth must be such as to assure a greater thickness of the layer 21, which in turn becomes somewhat thicker than the thickness of the external extrusion orifice. This will determine the braking of the internal layer by part of the opening adjusted at 80 and, therefore, the onset of breaking of the boundary layer and, hence, of the final extrusion on cylinder 62, as required.

A second system for the elimination of the disadvantage consists in allowing a slight leakage of material along the sides of the extrusion chamber 22, either by suitably dimensioning the shoulder rings closing the chamber 22 against the rotor 62 and the stator housing 60 in the opening of the play against the surface of the cylinder, or in producing, immediately upstream of the external extrusion orifice, still within the chamber 22, and evenly distributed along the entire width of extrusion under the device 80, a uniform groove 23 radiating through the transversal opening 24, thus producing a calculated leakage of material out of the chamber 22 and, therefore, allowing this quantity to escape extrusion. In this case, the layer 21 extruded internally must supplant either the amount of extrusion or the amount of leakage and, therefore, must be of a greater thickness than that of the extruded film 8. If the thickness thus obtained downstream of the internal extrusion orifice is greater than the thickness of the external extrusion orifice, the onset of breakage of the boundary layer takes place smoothly and the desired extrusion on the rotating cylinder continues to operate.

In summary, the advantages reside in the application of the internal extrusion device 76, in the necessity of providing as a solution, a leakage of material from the extrusion chamber on the cylinder through a channel other than that of the external final extrusion orifice. The designer will ascertain the extent of the resulting stresses on the extrusion cylinder in order to dimension it so as to contain its flexion within acceptable limits, or to resort to balancing devices to be located inside said cylinder by a suitable method, such as that indicated schematically in FIG. 3, in which 25 is a chamber feeding oil under regulated pressured, closed from the scraping elements 26. The pressure of the oil can be regulated automatically from the outside in a function of the deflection of the cylinder 62, and set at the level which provides the best equilibrium and therefore the minimum deflection. In conditions of equilibrium, the internal shafts 28 will flex instead of cylinders 62.

The execution of this mode of extrusion makes possible the most diverse productions, such as films, sheets, layers, laminate coatings which can be introduced in chamber 29 under the automatic closing device 4, artificial skins obtainable for the first time by extrusion, introducing the supporting fabric also in the chamber 29 under the opening of the closing element 4. The artificial skin obtained with this technology acquires exceptionally great strength in comparison to that obtained with other processes, such as application or calendering, because of the resistance of the fabric, of the support of the plastic layer, under high pressure of the plastic material in extrusion in chamber 68, as well as in chamber 22. In these conditions, a penetration of the material in the mesh of the supporting fabric takes place, making it impossible to come off subsequently. What has been said in connection with artificial skin holds true also for paneling.

With respect to the direct extrusion on the rotor of the boundary layer press, as in FIG. 1, it is obviously possible to make the most advantageous setting of the press independently of the best setting for the extrusion process. The advantages of this system of extrusion have proven to be very numerous with respect to the use of conventional dies as well as in connection with the calendering technology.

While specific embodiments of the invention have been shown and described in detail to illustrate the application of the principles of the invention, it will be understood that the invention may be embodied otherwise without departing from such principles.

What is claimed is:

1. A method of extruding pasty and thermoplastic material comprising the steps of:

directing the material into contact with a second rotating rotor (64);

carrying the material on the second rotor past a control extrusion device (70) and into a feed space to cause the material to form into a first layer on the second rotor;

moving said first layer on the second rotor past an opposite adjustable extrusion device (72) which extends into the feed space more than the control device to form an infeed material mass (68);

said infeed material mass being formed by the opposite adjustable extrusion device by a boundary layer breaking up of said first layer;

directing said infeed material mass through a first passage (74) and toward a first rotating rotor (62);

providing a first adjustable extrusion device (76) at the end of said first passage and at a position spaced from said first rotating rotor;

feeding said infeed material mass between said first adjustable extrusion device and said first rotating rotor to form a second layer on said first rotor;

moving said second layer on said first rotor into an extrusion passage (22);

providing a second adjustable extrusion device at an end of said extrusion passage spaced from said first rotor a distance less than the spacing between said first adjustable extrusion device and said first rotor;

moving said second layer past said second adjustable extrusion device to form a third layer which is thinner than said second layer and to cause an accumulation of material behind said extrusion device and effect a boundary layer break-up of said first layer; and providing a leakage of material out of said extrusion passage in a position in said extrusion passage adjacent said second adjustable extrusion device to prevent a filling up of the extrusion passage in the area between said first and second extrusion devices due to said accumulation of material.

2. A method according to claim 1, wherein a second material is introduced into the extrusion passage below the second layer which is extruded by the first extrusion device.

* * * * *